United States Patent
Frantz et al.

(10) Patent No.: US 12,365,444 B2
(45) Date of Patent: Jul. 22, 2025

(54) MODULE FOR AN AIRCRAFT TURBINE ENGINE

(71) Applicant: SAFRAN AIRCRAFT ENGINES, Paris (FR)

(72) Inventors: Caroline Marie Frantz, Moissy-Cramayel (FR); Bastien Pierre Verdier, Moissy-Cramayel (FR); Jean Charles Olivier Roda, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/695,308

(22) PCT Filed: Sep. 26, 2022

(86) PCT No.: PCT/FR2022/051801
§ 371 (c)(1),
(2) Date: Mar. 25, 2024

(87) PCT Pub. No.: WO2023/052714
PCT Pub. Date: Apr. 6, 2023

(65) Prior Publication Data
US 2025/0002138 A1 Jan. 2, 2025

(30) Foreign Application Priority Data
Sep. 29, 2021 (FR) ........................ 2110286

(51) Int. Cl.
*B64C 11/38* (2006.01)
*B64C 11/44* (2006.01)
*F01D 7/00* (2006.01)

(52) U.S. Cl.
CPC .............. *B64C 11/38* (2013.01); *B64C 11/44* (2013.01); *F01D 7/00* (2013.01);
(Continued)

(58) Field of Classification Search
CPC ......... B64C 11/38; B64C 11/40; B64C 11/42; B64C 11/44; F01D 7/00; F05D 2220/323;
(Continued)

(56) References Cited

U.S. PATENT DOCUMENTS 2,403,532 A 7/1946 Hoover
3,115,939 A 12/1963 Beringer et al.
(Continued)

FOREIGN PATENT DOCUMENTS

EP 3239041 A1 * 11/2017 ............. B64C 11/38
FR 2831225 A1 4/2003
FR 3087232 A1 4/2020

OTHER PUBLICATIONS

International Search Report and Written Opinion received for PCT Patent Application No. PCT/FR2022/051801, mailed on Dec. 19, 2022, 21 pages (10 pages of English Translation and 11 pages of Original Document).

*Primary Examiner* — Woody A Lee, Jr.
*Assistant Examiner* — Jesse M Prager
(74) *Attorney, Agent, or Firm* — WOMBLE BOND DICKINSON (US) LLP (57) ABSTRACT

A module including a device for changing the pitch of the vanes about the pitch axes thereof, the device including: a hydraulic actuator capable of rotating about the longitudinal axis (X) and configured to rotate the vanes about their pitch axes (C), a supply pump for supplying fluid to the hydraulic actuator, the supply pump including a drive shaft capable of rotating about the longitudinal axis (X) and a shell that is rotationally fixed relative to the longitudinal axis (X), and an electric machine configured to operate the supply pump, the electric machine having a rotary member for driving the drive shaft and a fixed member that is rotationally fixed relative to the longitudinal axis (X).

11 Claims, 5 Drawing Sheets

(52) U.S. Cl.
CPC .................. *F05D 2220/323* (2013.01); *F05D 2260/40311* (2013.01); *F05D 2260/406* (2013.01)

(58) Field of Classification Search
CPC ..... F05D 2260/40311; F05D 2260/406; F02C 7/06; F04D 29/323; F04D 29/325; F04D 29/36; F04D 29/362; F04D 25/028; F04D 25/0693
See application file for complete search history.

(56) References Cited

U.S. PATENT DOCUMENTS

| | | | |
|---|---|---|---|
| 6,196,797 B1 * | 3/2001 | Bogden | B63H 3/06 416/157 R |
| 2003/0077173 A1 | 4/2003 | Franchet et al. | |
| 2022/0003123 A1 | 1/2022 | Tajan et al. | |
| 2024/0253770 A1 * | 8/2024 | De Wergifosse | B64C 11/44 |

\* cited by examiner

MODULE FOR AN AIRCRAFT TURBINE ENGINE

TECHNICAL FIELD OF THE INVENTION

The invention relates to the field of the modules for an aircraft turbine engine. The invention relates more particularly to the modules comprising a hub movable in rotation and variable pitch vanes carried by the hub, such as the fan or propeller modules.

TECHNICAL BACKGROUND

The prior art is illustrated by the documents U.S. Pat. Nos. 2,403,532 and 3,115,939.

An aircraft turbine engine generally comprises a module extending around a longitudinal axis and having a hub movable in rotation around the longitudinal axis and on which vanes are mounted. The module is typically connected to a gas generator. The gas generator comprises, for example, from upstream to downstream, a low-pressure compressor, a high-pressure compressor, a combustion chamber, a high-pressure turbine, a low-pressure turbine and a gas exhaust nozzle. The rotor of the high-pressure compressor is connected to the rotor of the high-pressure turbine by a high-pressure shaft and the rotor of the low-pressure compressor is connected to the rotor of the low-pressure turbine by a low-pressure shaft. The low-pressure shaft is also connected to a drive shaft of the hub of the module to drive it in rotation.

The module is, for example, a fan or a propeller. In the case of a fan, the vanes are surrounded by an external casing attached to a nacelle of the aircraft. In the case of a propeller, the fan vanes are mounted outside the nacelle and are therefore not surrounded by an external casing.

In order to optimise the operation of the module and ensure its operability according to the phases of flight of the aircraft, in particular by maintaining a sufficient pumping margin, it is known to modify the orientation of the vanes during the flight of the aircraft. To this end, the vanes are movable about a pitch axis that extends perpendicular to the longitudinal axis. The vanes are referred to as variable pitch or variable pitch vanes. For example, the variable pitch vanes can occupy a reverse thrust position, in which they generate counter-thrust to help slow down the aircraft, and a feathered position, in which, in the event of failure or breakdown, they limit their resistance.

In order to rotate the vanes about their pitch axis, the module of the turbine engine typically comprises a vane pitch change device arranged inside the hub of the module. The document FR-A1-3 087 232 describes a turbine engine comprising a fan module with a movable hub that can move about a longitudinal axis and on which variable pitch vanes are mounted. The module comprises a vane pitch change device comprising a hydraulic actuator connected to the vanes, a fluid supply pump for the hydraulic actuator and an electric motor for driving the supply pump.

According to this document, the supply pump is movable in rotation about the longitudinal axis and the electric motor can be moved about the longitudinal axis, i.e. the stationary member of the motor, also referred to as the stator, is attached to the hub of the module and is therefore in a rotating frame of reference of the module. The device for changing the pitch of the vanes also comprises a rotating electrical transformer for supplying electrical power to the motor from an electrical power source located in a stationary reference frame on the turbine engine.

The document FR-A1-2 831 225 describes a turbine engine comprising a fan module with a movable hub that can move about a longitudinal axis and on which variable pitch vanes are mounted. The module comprises a device for changing the pitch of the vanes which comprising a hydraulic actuator, a fluid supply pump for the hydraulic actuator and an electric motor for driving the supply pump. According to this document, the supply pump and the electric motor are movable in rotation about the longitudinal axis. In this context, the device for changing the pitch of the vanes also comprises a rotating electrical transformer for supplying electrical energy to the motor from an electrical energy source located in a stationary reference frame on the turbine engine.

These configurations are not entirely satisfactory in that the electric motor is permanently driven in rotation, leading to a high consumption of electrical power and a large motor size. In addition, the module of the turbine engine has an overall dimension that makes it difficult to add an electrical transformer. Adding a transformer means increasing the size of the module. The mass and the cost of the transformer are also significant. In addition, rotating the supply pump around the axis of the turbine engine is problematic. It has been found that at high speeds of rotation of the module, the pump can suffer irreversible damage.

There is therefore a need to provide a turbine engine module for an aircraft, comprising a hub carrying variable pitch vanes, that is reliable, compact, lightweight, low in power consumption and low in cost.

SUMMARY OF THE INVENTION

To this end, the invention proposes a module for an aircraft turbine engine, this module comprising a longitudinal axis and comprising:
 a hub movable in rotation about the longitudinal axis,
 vanes carried by the hub, each of these vanes being movable in rotation about a pitch axis extending radially with respect to the longitudinal axis, and
 a device for changing the pitch of the vanes about their pitch axes, this device comprising:
  a hydraulic actuator movable in rotation about the longitudinal axis and is configured to drive the vanes about their pitch axes,
  a pump for supplying fluid to the hydraulic actuator, this supply pump comprising a drive shaft movable in rotation about the longitudinal axis and an envelope fixed in rotation about the longitudinal axis, and
  an electric machine configured to actuate the supply pump, the electric machine comprising a rotary member for driving the drive shaft and a stationary member which is fixed in rotation relative to the longitudinal axis.

The hydraulic actuator drives the vanes around their pitch axes to optimise the performance of the module according to the aircraft's flight phases. The hydraulic actuator is supplied with fluid by the supply pump. The supply pump is actuated by the electric machine, which supplies mechanical energy to the pump for its operation. According to the invention, both the envelope of the supply pump and the stationary member of the electric machine are fixed in rotation relative to the longitudinal axis. In other words, the supply pump and the electric machine supplying power to the supply pump are fixed in rotation relative to the longitudinal axis of the module.

As a result, the electric machine and the supply pump are in a stationary reference frame on the module. Unlike the module of the prior art, in which the electric motor is in a rotating reference frame, i.e. both the stationary member and the movable member are driven in rotation about the longitudinal axis, such a configuration according to the invention dispenses with the need for a rotating electrical transformer to transfer electrical energy from an energy source located in a stationary reference frame of the module towards the electric machine. The module is therefore simpler and more compact. Also, as the stationary member of the machine is no longer driven in rotation around the longitudinal axis of the turbine engine, the electrical power consumption of the module is lower. This allows the electric machine to be sized accordingly. Lastly, this type of module is more reliable because the rotation of the hub no longer affects the elements of the device, such as the supply pump, which now has an envelope that is also fixed in rotation relative to the longitudinal axis.

The invention may comprise one or more of the following characteristics, taken alone or in combination with each other:
- the device comprises a fluid transfer unit arranged axially between the supply pump and the hydraulic actuator and comprising a first hub fixed in rotation about the longitudinal axis and having an internal passage in fluid communication with the supply pump and a second hub movable in rotation about the longitudinal axis arranged around the first hub and having second channels in fluid communication with the hydraulic actuator and the internal passage;
- the supply pump is a reversible fixed-displacement pump;
- the electric machine is an electric motor;
- a drive shaft configured to drive the hub in rotation and a mechanical speed reducer configured to connect the drive shaft to a low-pressure shaft of the turbine engine, the speed reducer being arranged downstream of the electric machine along the longitudinal axis and comprising a first element intended to cooperate with the low-pressure shaft, a second element secured in rotation to the drive shaft and a third element fixed in rotation and connected to the stationary member of the electric machine;
- the first element is a sun gear, the second element is a ring gear and the third element is a planet carrier;
- the device comprises a hydraulic accumulator that is fixed in rotation relative to the longitudinal axis and in fluid communication with the supply pump, the hydraulic accumulator being arranged downstream of the hydraulic actuator along the longitudinal axis;
- the device comprises a hydraulic accumulator arranged upstream of the hydraulic actuator along the longitudinal axis and secured to the hydraulic actuator, the hydraulic accumulator being in fluid communication with the supply pump;
- the pump has an operating regime that is a function of a power of the electric machine, the module further comprising an electronic control circuit connected to the electric machine and configured to modulate the power of the electric machine;
- the electronic control circuit is configured to receive an order transmitted by a control unit, the order being a function of an information relating to the aircraft and/or the turbine engine and/or the position of the vanes relative to their pitch axes and received by the control unit,
- the hub comprises an internal space in which the device is arranged
- the terms upstream and downstream are defined in relation to the flow of gases in the module along the longitudinal axis,
- the hydraulic actuator is connected to the vanes,
- the hydraulic actuator is a hydraulic cylinder comprising a case and a body movable in translation in the case, the movable body being connected to the vanes.

BRIEF DESCRIPTION OF THE FIGURES

Further characteristics and advantages will be apparent from the following description of a non-limiting embodiment of the invention with reference to the appended drawings in which.

DETAILED DESCRIPTION OF THE INVENTION

An aircraft comprises a fuselage and at least two wings extending on either side of the fuselage along the fuselage axis. At least one turbine engine is mounted under each wing. The turbine engine can be a turbojet engine, for example a turbine engine equipped with a ducted fan equipped with variable pitch vanes, referred by the acronym VPF for "Variable Pitch Fan". Alternatively, the turbine engine can be a turboprop engine, for example a turbine engine equipped with a unducted propeller (open rotor, USF for Unducted Single Fan or UDF for Unducted Dual Fan). Of course, the invention is applicable to other types of turbine engine.

Figure 1:
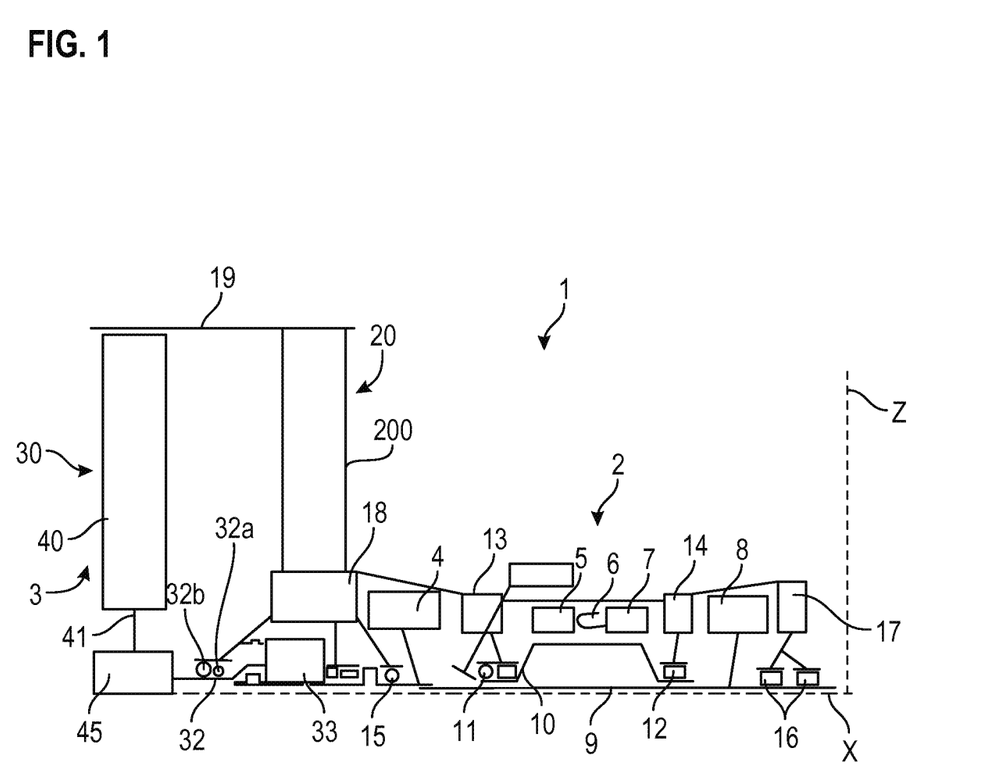
FIG. 1 is a schematic representation of an aircraft half-turbine engine in axial cross-section.

In the present invention, and in general, the terms "upstream", "downstream", "axial" and "axially" are defined in relation to the flow of gases in the turbine engine or a module of the turbine engine and here along the longitudinal axis X (and even from left to right in FIG. 1). Similarly, the terms "radial", "radially", "internal", "inner", "external", and "outer" are defined with respect to a radial axis Z perpendicular to the longitudinal axis X and with respect to the distance from the longitudinal axis X.

"Fixed in rotation" means that the element is connected to a stationary structure of the module or of the turbine engine, such as a casing, and "movable in rotation" means that the element is connected to a structure movable in rotation, such as a rotating hub or a shaft.

FIG. 1 shows an example of a turbine engine 1. The turbine engine 1 comprises a gas generator 2 and a module 3 in accordance with the invention. The gas generator 2 comprises, from upstream to downstream, a low-pressure compressor 4, a high-pressure compressor 5, a combustion chamber 6, a high-pressure turbine 7 and a low-pressure turbine 8. The rotors of the low-pressure compressor 4 and of the low-pressure turbine 8 are mechanically connected by a low-pressure shaft 9 so as to form a low-pressure body. The rotors of the high-pressure compressor 5 and of the high-pressure turbine 7 are mechanically connected by a high-pressure shaft 10 so as to form a high-pressure body.

The high-pressure shaft 10 extends radially at least partly outside the low-pressure shaft 9. The low-pressure shaft 9 and the high-pressure shaft 10 are coaxial. The high-pressure body is guided in rotation about the longitudinal axis X by a first rolling bearing 11 upstream and a second rolling bearing 12 downstream. The first bearing 11 is mounted between an inter-compressor casing 13 and an upstream end of the high-pressure shaft 10. The inter-compressor casing 13 is arranged axially between the low and high pressure compressors 4, 5. The second bearing 12 is mounted between an inter-turbine casing 14 and a downstream end of the high-pressure shaft 10. The inter-turbine casing 14 is arranged axially between the low and high pressure turbines 8, 7. The low-pressure body is guided in rotation about the longitudinal axis X via a third rolling bearing 15 and a fourth rolling bearing 16. The fourth bearing 16 is a double bearing, for example. The double bearing 16 is mounted between an exhaust casing 17 and a downstream end of the low-pressure shaft 9. The exhaust casing 17 is located downstream of the low-pressure turbine 8. The third bearing 15 is mounted between an inlet casing 18 and an upstream end of the low-pressure shaft 9. The inlet casing 18 is located upstream of the low-pressure compressor 4. More specifically, the inlet casing 18 is arranged axially between the module 3 and the low-pressure compressor 4.

In the example shown in FIG. 1, the module 3 is mounted upstream of the gas generator 2. Advantageously, according to this example, a stator vane 20 is arranged axially between the module 3 and the low-pressure compressor 4. The stator vane 20 comprises, for example, vanes 200 mounted on the inlet casing 18. These vanes 200 are referred to as OGV (Outlet Guide Vanes). The stator vane 20 allows to rectify the flow downstream of the module 3 to optimise the operation of the turbine engine 1.

In another embodiment, not shown, the module 3 is mounted downstream of the gas generator 2.

In addition, the module 3 according to the invention comprises vanes 30.

In the example shown in FIG. 1, the vanes 30 are surrounded by an external casing 19. The external casing 19 is attached to a nacelle (not shown) of the aircraft. In this example, the module 2 is a fan module.

In another example not shown, the module 2 is a propeller module. The vanes 30 are not surrounded by an external casing. In this example, the vanes 30 are arranged around the nacelle.

Figure 2:
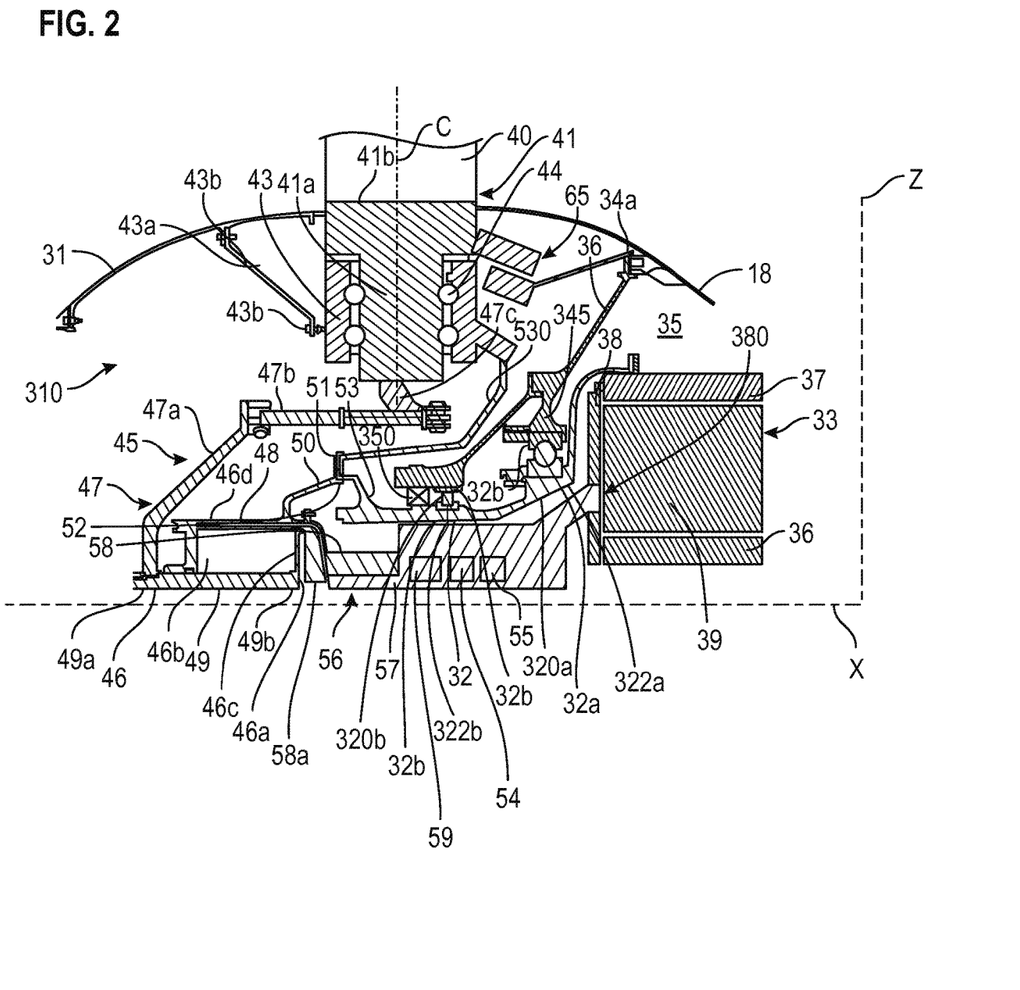
FIG. 2 is an axial sectional view of the module according to a first embodiment of the invention.
Figure 4:
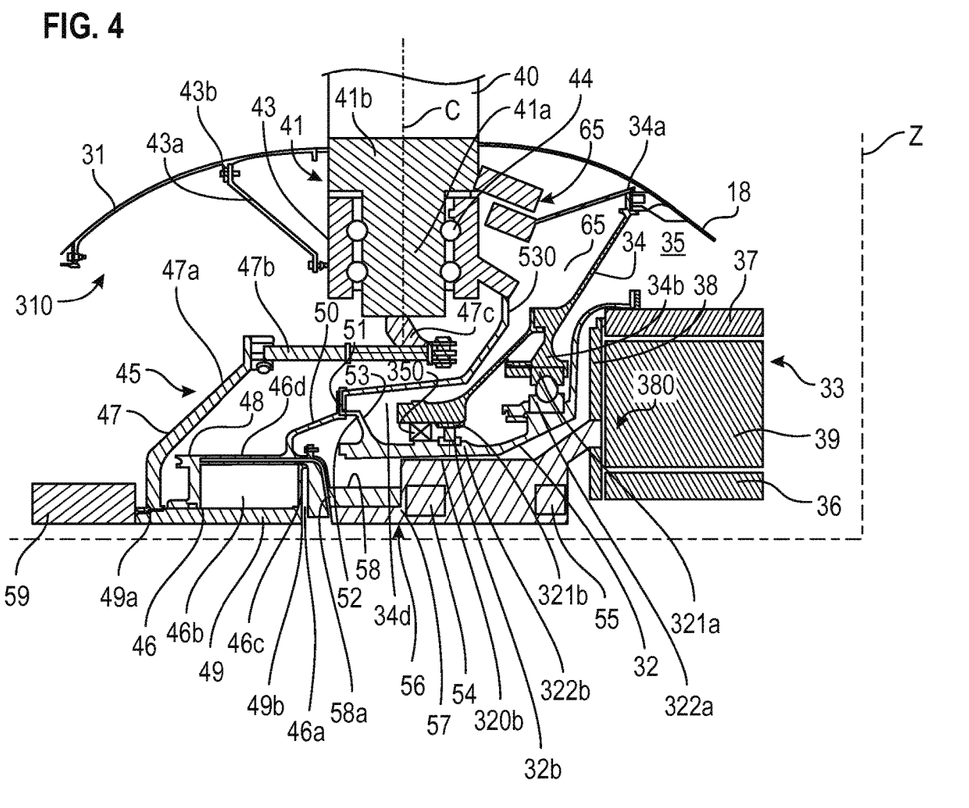
FIG. 4 is an axial sectional view of the module according to a second embodiment of the invention.

As can be seen in FIGS. 2 and 4, the vanes 30 are carried by a hub 43. The hub 43 is annular. It is arranged around the longitudinal axis X. The vanes 30 are evenly distributed around the hub 43. The vanes 30 extend radially from the hub 43. It comprises an internal space 310. The hub 43 also comprises inner housings evenly distributed around the longitudinal axis X.

The hub 43 is secured to a cone 31 centered on the longitudinal axis X. The cone 31 is arranged upstream of the hub 43. The cone 31 forms an air inlet nozzle for the turbine engine 1. The hub 43 is for example connected to the cone 31 by an attachment arm 43a extending radially with respect to the longitudinal axis X. The attachment arm 43a is connected to the cone 31 and to the hub 43 by an assembly of screws and nuts 43b, for example.

The vanes 30 are driven in rotation about the longitudinal axis X. Each vane 30 comprises a root 41 and a blade 40 extending radially outwards from the root 41.

The root 41 comprises a tenon 41b connected to a sleeve 41a. The root 41 is pivotally mounted along a pitch axis C in the inner housing of the hub 43. The sleeve 41a is centered on the pitch axis C. The sleeve 41a is housed in the inner housing of the hub 43. Advantageously, a root 41 is mounted per inner housing.

The pitch axis C is parallel to the radial axis Z. The root 41 is pivotally mounted by means of two guide bearings 44 mounted in each inner housing and superimposed along the radial axis Z. These bearings 44 are preferably, but not exclusively, ball bearings.

The hub 43 is movable in rotation about the longitudinal axis X. To drive the hub 43 in rotation about the longitudinal axis X and therefore the vanes 30, the module 3 comprises a drive shaft 32. The drive shaft 32 is arranged at least partly in the internal space 310. It is centered on the longitudinal axis X. The drive shaft 32 is guided in rotation in the internal space 310 by a first guide bearing 32a and a second guide bearing 32b. The first guide bearing 32a is a ball bearing, for example. The second guide bearing 32b is a roller bearing, for example. The first guide bearing 32a is arranged downstream of the second guide bearing 32b. The first guide bearing 32a comprises balls 320a arranged between an external ring 321a and an internal ring 322a. The second guide bearing 32b comprises rollers 320b arranged between an external ring 321b and an internal ring 322b. The internal rings 322a, 322b are secured to the drive shaft 32a and the external rings 321a, 321b are carried by a bearing support 34. The bearing support 34 is stationary. It extends radially between an end flange 34a connected to the inlet casing 18 and first and second soleplates 34b, 34c which cooperate respectively with the external rings 321a, 321b.

The drive shaft 32 comprises an upstream end to which a trunnion 53 is attached. The trunnion 53 extends radially outwards. The trunnion 53 is connected, for example by a first flange 52, to an intermediate arm 530 which is itself connected to the hub 43 to drive it in rotation about the longitudinal axis X.

The drive shaft 32 is driven in rotation by the low-pressure shaft 9, for example. In order to reduce the speed of rotation of the drive shaft 32 relative to the low-pressure shaft 9, the module 3 advantageously comprises a mechanical speed reducer 33. The speed reducer 33 is arranged in a lubrication enclosure 35 extending axially between the third bearing 15 and the second guide bearing 32b. In order to limit the lubricant leaks outside the lubrication enclosure 35, a sealing device 350 is arranged upstream of the second bearing 32b. The sealing device 350 comprises, for example, a dynamic seal.

The speed reducer 33 comprises a first element 36 which cooperates with the low-pressure shaft 9, a second element 37 which is secured in rotation to the drive shaft 32 and a third element 38 which is fixed in rotation. The third element 38 is connected, for example, to a stator of the turbine engine 1, such as the inlet casing 18 or of the module 3. The speed reducer 33 also comprises planet gears 39.

The first element 36 is an inner planetary gear coupled in rotation with the low-pressure shaft 9, the second element 37 is an outer ring gear coupled in rotation with the drive shaft 32 and the third element 38 is a planet carrier fixed in rotation with respect to the longitudinal axis X. The planet carrier is, for example, secured to the inlet casing 18. The planet carrier has at least one passage 380. The passage 380 is a through passage. In this configuration of the reducer 33, the planet gears 39 are carried by the third element 38 and each rotate about an axis substantially parallel to the longitudinal axis X. Each planet gear 39 meshes with the first element 36 and the second element 37. The planet gears 39 are arranged radially between the first element 36 and the second element 37. In this configuration, the first element 36, which is the planetary gear, forms the input of the speed reducer 33, while the second element 37, which is the outer ring gear, forms the output of the speed reducer 33. The speed reducer 33 is a speed reducer 33 with a planetary gear train.

Each vane 30 is movable in rotation about the pitch axis C. To this end, according to the invention, the module 3 comprises a device 45 for changing the pitch of the vanes 30 about their pitch axes C. The device 45 is an electro-hydraulic device. The device 45 is arranged at least partly in the internal space 310 of the hub 43. The device 45 is advantageously arranged in the internal space 310. The device 45 is arranged upstream of the speed reducer 33. The device 45 comprises a hydraulic actuator 46 which is movable in rotation about the longitudinal axis X and configured to drive the vanes 30 about their pitch axes C. The actuator 46 is, for example, a hydraulic cylinder.

The actuator 46 comprises a case 48 and a movable body 49 which can be moved in translation within the case 48. The case 48 is secured in rotation to the drive shaft 32. The case 48 is cylindrical, centered on the longitudinal axis X. This configuration allows to limit the overall dimension required by the actuator 46 in the hub 43, both axially and radially. The case 48 comprises a shell 50 which extends radially outwards from an external surface of the case 48. The shell 50 comprises a second flange 51 which is attached to the first flange 52 of the trunnion 53.

The movable body 49 moves in translation along the longitudinal axis X in the case 48. The case 48 extends radially around the movable body 49. The movable body 49 is in the form of an axial rod extending between a first end 49a and a second end 49b. The actuator 46 also comprises a first chamber 46a and a second chamber 46b. The first and second chambers 46a, 46b are axially delimited by an annular wall 46c arranged in the case 48. The annular wall 46c is secured to the second end 49b of the movable body 49. The movable body 49 moves in translation under the effect of the pressure of a fluid circulating in each chamber 46a, 46b.

The actuator 46 also comprises a pipe 46d. The pipe 46d has an axis parallel to the longitudinal axis X. The pipe 46d is formed, for example, in an external wall of the case 48. The pipe 46d opens into the second chamber 46b.

The device 45 advantageously comprises a connection mechanism 47 secured to the vanes 30 and to the actuator 46. The connection mechanism 47 allows to transform the translational movement of the hydraulic actuator 46 into a rotational movement of the vanes 30. The connection mechanism 47 comprises an annular part 47a, a connecting rod 47b and an eccentric 47c. The annular part 47a is removably attached to the movable body 49 and, for example, to the second end 49a. The annular part 47a comprises a connecting flange which is removably connected to the connecting rod 47b. The connecting rod 47b cooperates with the eccentric 47c which is secured to the vane 30 and in particular connected to the root 41 of the vane 30. The annular part 47a thus allows the hydraulic actuator 46 to be dismantled during maintenance operations, for example, without affecting the vanes 30, which remain attached to the connecting rods 47b by means of the eccentric.

In order to drive the movable body 49 in translation so as to drive the vanes 30 about their pitch axis C via the connection mechanism 47, the device 45 according to the invention also comprises a pump 54 for supplying fluid to the actuator 46. The pump 54, for example, is arranged axially between the reducer 33 and the hydraulic actuator 46.

The pump 54 is arranged inside the drive shaft 32. The pump 54 comprises a drive shaft also referred to as shaft and an envelope, also referred to as the pump body, arranged around the drive shaft. The drive shaft is centered on the longitudinal axis X, for example, and is movable in rotation about the longitudinal axis X. According to the invention, the envelope of the pump 54 is stationary relative to the longitudinal axis X. Advantageously, the envelope of the pump 54 is secured to the third element 38 of the reducer 33. The envelope of the pump 54 is secured to the planet carrier. This configuration of the pump 54 allows to increase the service life of the pump 54, which is not driven in rotation about the longitudinal axis X.

The pump 54 is a positive displacement hydraulic pump. The pump 54 is, for example, an axial or radial piston pump. An axial piston pump is a pump whose drive shaft is parallel to the axis of the piston and a radial piston pump is a pump whose piston axis is inclined to the drive shaft. The pump 54 is, for example, a reversible fixed-displacement pump. In this way, the pump 54 can rotate in a first direction of rotation and in a second direction of rotation opposite to the first direction. In the first direction of rotation, the pump 54 delivers a fluid to the first chamber 46a, while in the second direction of rotation, the pump 54 delivers a fluid to the second chamber 46b. A pump with this type of drive has a longer service life than a variable displacement pump.

Figure 3:
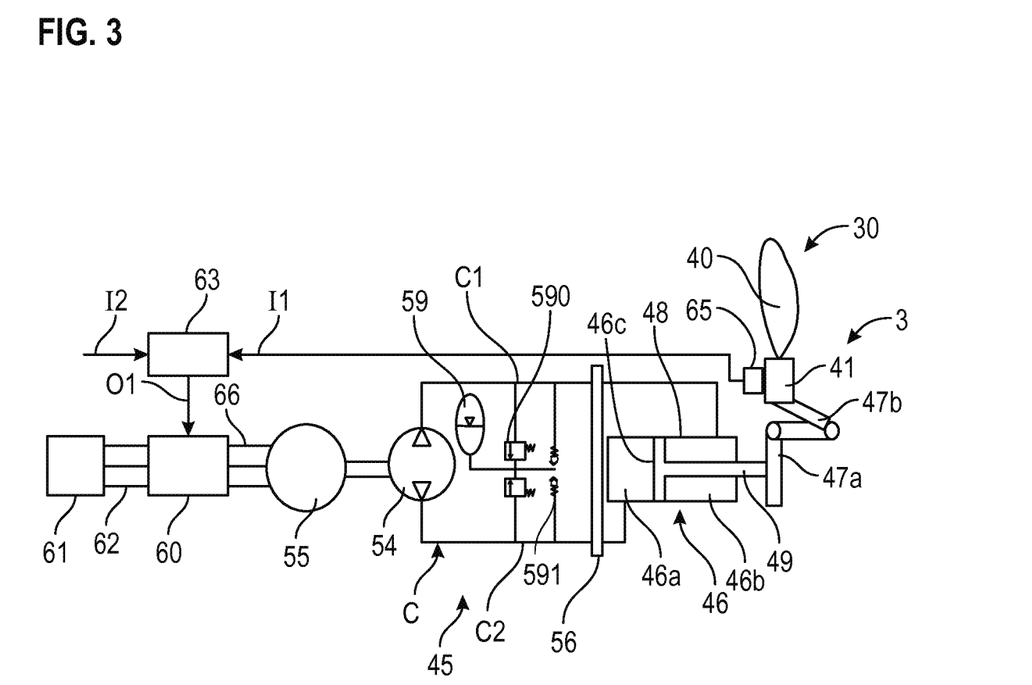
FIG. 3 is a schematic functional representation of the module according to the first embodiment of the invention.

The pump 54 is fluidically connected to a hydraulic supply circuit C. The hydraulic supply circuit C is a closed circuit. It is independent of a lubrication circuit of the turbine engine 1, for example designed to lubricate the reducer 33. The hydraulic supply circuit C comprises a hydraulic accumulator 59. The hydraulic accumulator 59 constitutes a pressurised fluid reservoir configured to supply a flow rate to the pump 54. The fluid is pressurised oil, for example. The hydraulic accumulator 59 is an advantageous reservoir in the context of the invention in that it allows to compensate the variations in the volume of the fluid due to its compressibility and its expansion.

The hydraulic accumulator 59 is in fluid communication with the pump 54.

The hydraulic supply circuit C comprises a main circuit C1 connecting the pump 54 to the hydraulic actuator 46 and a recovery circuit C2 connecting the hydraulic actuator 46 to the pump 54. The hydraulic supply circuit C comprises, for example, a safety valve 590 and a non-return valve 591.

In a first embodiment shown in FIG. 1, the hydraulic accumulator 59 is arranged downstream of the hydraulic actuator 46. The hydraulic accumulator 59 is fixed in rotation with respect to the longitudinal axis X. It is, for example, integrated into the supply pump 54.

In a second embodiment shown in FIG. 4, the hydraulic accumulator 59 is arranged upstream of the hydraulic actuator 46. The hydraulic accumulator 59 is movable in rotation relative to the longitudinal axis X. It is, for example, secured to the hydraulic actuator 46.

Figure 5:
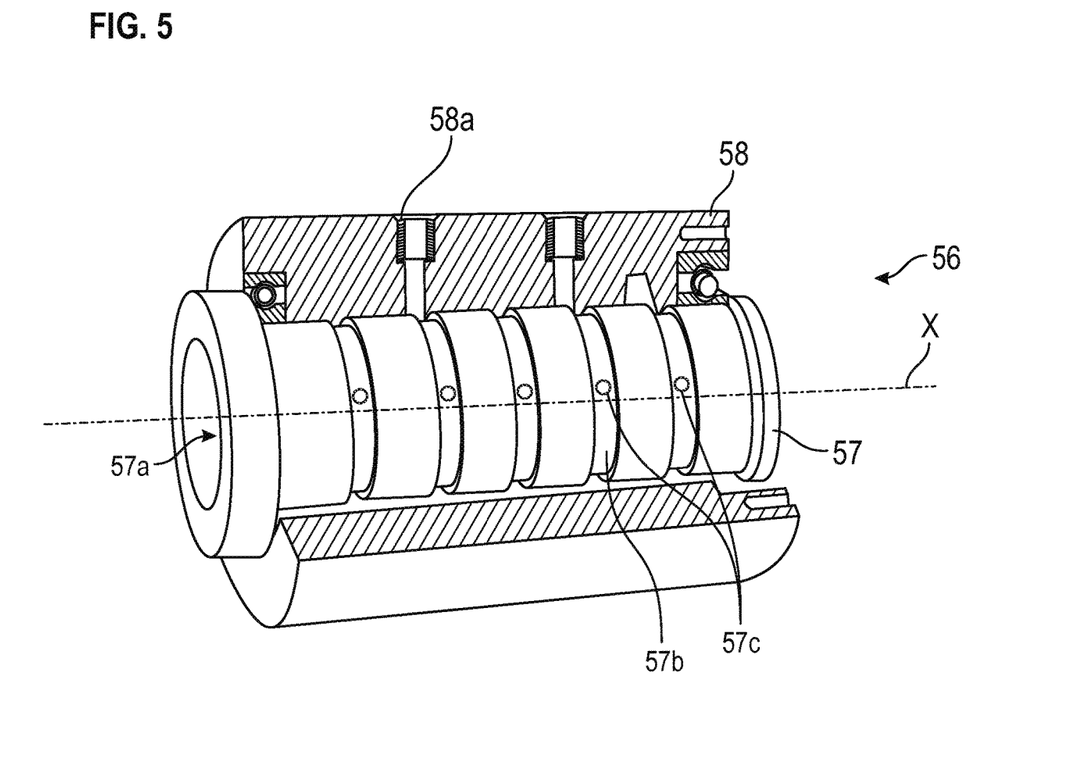
FIG. 5 is a partial cross-sectional view of an example of a transfer unit that can be equipped to the module of the invention.

In addition, the device 45 advantageously comprises a fluid transfer unit 56, for example shown in FIG. 5. The transfer unit 56 transfers the fluid from the pump 54, which is fixed in rotation, to the actuator 46, which is movable in rotation about the longitudinal axis X. The transfer unit 56 has very little impact on the weight and the overall dimension of the module 3 compared with an electrical transformer.

The transfer unit 56 is arranged axially between the hydraulic actuator 46 and the pump 54, inside the drive shaft 32. The transfer unit 56 is mounted on the hydraulic circuit C. The transfer unit 56 comprises a first hub 57 which is fixed in rotation about the longitudinal axis X. The first hub 57 is centered on the longitudinal axis X, for example. The first hub 57 is secured, for example, to the third element 36 of the speed reducer 33. The first hub 57 has an internal passage 57a for the circulation of the fluid 57a in fluid communication with the pump 54. The first hub 57 also comprises bores 57c allowing the fluid to pass from the internal passage 57a towards grooves 57b provided on an external surface of the first hub 57. The grooves 57b are annular. The transfer unit 56 also comprises a second hub 58 which is movable in rotation about the longitudinal axis X. In the example shown, the second hub 58 is arranged coaxially around the first hub 57. The second hub 58, for example, is secured in rotation to the actuator 46. In addition, the second hub 58 has channels 58a in fluid communication with the actuator 46 and the grooves 57b. The channels 58a are, for example, in fluid communication with the pipe 46d of the actuator 46. The channels 58a extend radially with respect to the longitudinal axis X. They are provided in a wall of the second hub 58.

According to another example, not shown, of the transfer unit 56, the second hub 58 is arranged inside the first hub 57.

According to the invention, the device 45 also comprises an electric machine 55. The electric machine 55 allows to supply mechanical energy to the pump 54 to ensure its operation. The speed of the pump 54 is determined by the amount of electrical energy transformed by the electric machine 55. The electric machine 55 thus allows the use of a reversible fixed displacement pump, since it is the electric machine 55 which modulates the quantity of fluid that the pump 54 can deliver to the hydraulic actuator 46. The electric machine 55 is, for example, an electric motor. The electric motor is preferably vector-controlled. The electric motor, for example, is reversible and variable speed.

In one example, the electric machine 55 is arranged axially between the pump 54 and the speed reducer 33, inside the drive shaft 32.

According to an example not shown, the electric machine 55, the supply pump 54 and the accumulator 59 are substantially coaxial.

The electric machine 55 comprises a rotating member (rotor) and a stationary member (stator) (not shown). The rotating and stationary members are annular and, for example, centered on the longitudinal axis X. The rotating member is, for example, arranged outside or inside the stationary member. The rotating member drives in rotation the drive shaft of the pump 54. The stationary member is connected to the third element 38 of the reducer 33, i.e. to the planet carrier. The stationary member is connected to a power supply cable 66. The power cable 66 passes through the passage in the third element 38 of the reducer 33. Alternatively, the power cable 66 passes through the planet gears 39. The power supply cable 66 is connected to a power supply device 61 that is fixed in rotation relative to the longitudinal axis X. The power supply device 61 is located, for example, in the turbine engine 1 or in a compartment of the aircraft. Thus, thanks to the invention, no rotating electrical transfer is required to supply electrical energy to the electric machine 55. This allows to reduce the weight and the overall dimension of the module 3.

Advantageously, the module 3 also comprises an electronic control circuit 60, which is fixed in rotation about the longitudinal axis. The electronic control circuit 60 is connected to the electric machine 55 and in particular to the stationary member by means of the power supply cable 66 for transporting electrical energy. The electronic control circuit 60 allows the power of the electric machine 55 to be modulated according to, for example, an information I1, I2 relating to the flight conditions of the aircraft and/or the state of the turbine engine and/or the position of the vanes 30 relative to their pitch axes C. In this way, the electric machine 55 is only driven as necessary and its speed and direction of rotation are imposed by the electronic control circuit 60. According to the invention, it is therefore no longer necessary to oversize the electric machine 55. The electronic control circuit 60 is connected to the power supply device 61 by an electrical cable 62.

Advantageously, the electronic control circuit 60 operates under the control of a control unit 63. The control unit 63 is located, for example, in the turbine engine 1 or in a compartment of the aircraft. The control unit 63 is, for example, a digital computer such as a FADEC (Full Authority Digital Electronic Computer). The control unit 63 is configured to transmit an order O1 to the electronic control circuit 60 as a function of the information I1, I2. The information I1 relates, for example, to the state of the turbine engine 1 and/or of the aircraft. The information I2 relates, for example, to the position of the vanes relative to the pitch axis (C).

Advantageously, the module 3 comprises a sensor 65. The sensor 65 is used to measure a datum and translate the datum to transmit information I1 relating to the position of the vanes with respect to the pitch axis (C), which is transmitted to the electronic control circuit 60 via the control unit 63.

In a first embodiment shown in FIGS. 2 and 4, the sensor 65 is a position sensor. The position sensor is configured to measure the position of the root 41 of the vane 30. The position sensor works in conjunction with the root 41, for example. The sensor 65 is electromagnetic, for example.

In another embodiment not shown, the sensor 65 is, for example, a linear sensor of the LVDT (Linear Variable Differential Transformer) type. The sensor 65 is configured to measure the position of the movable body 49 of the hydraulic actuator 46. For example, it is located in the hydraulic actuator 46.

The sensor 65 supplies the information I1 to the control unit 63, which sends the order O1 to the electronic control circuit 60 as a function of this information I1.

The electronic control circuit 60 will then supply electrical energy to the electric machine 55, which will then act on the supply pump 54. According to the order sent to the electronic control circuit 60, the latter modulates the speed of the electric machine 55 in order to adapt the speed of the supply pump 54 according to the desired pitch of the vanes 30.

According to the invention, it is therefore not necessary to have an electrical transformer to supply power to the electric machine 55 since it is fixed in rotation about the longitudinal axis X. Also, according to the invention, it is possible to modulate the electrical power of the electric machine 55 and therefore of the supply pump 54 in order to control the hydraulic actuator 46 accordingly. It is therefore not necessary to add a hydraulic directional valve between the supply pump 54 and the hydraulic actuator 46 to modulate the movement of the movable body 49 of the hydraulic actuator 46 according to the desired pitch of the vanes 30. This configuration therefore simplifies the module 3 and reduces its overall dimension.

The invention claimed is:

1. A module for an aircraft turbine engine, this module comprising a longitudinal axis (X) and comprising:
    a hub movable in rotation about the longitudinal axis (X), vanes carried by the hub, each of these vanes being movable in rotation about a pitch axis (C) extending radially with respect to the longitudinal axis (X), and a device for changing the pitch of the vanes about their pitch axes (C), this device comprising:

a hydraulic actuator movable in rotation about the longitudinal axis (X) and configured to drive the vanes about their pitch axes (C),     a pump for supplying fluid to the hydraulic actuator, this supply pump comprising a pump shaft which is movable in rotation about the longitudinal axis (X) and an envelope which is fixed in rotation about the longitudinal axis (X), and     an electric machine configured to actuate the supply pump, the electric machine comprising a rotary member for driving the pump shaft and a stationary member which is fixed in rotation with respect to the longitudinal axis (X).

2. The module according to claim 1, wherein the device comprises a fluid transfer unit arranged axially between the supply pump and the hydraulic actuator and comprising a first hub fixed in rotation about the longitudinal axis (X) and having an internal passage in fluid communication with the supply pump and a second hub movable in rotation about the longitudinal axis (X) arranged around the first hub and having second channels in fluid communication with the hydraulic actuator and the internal passage.

3. The module according to claim 1, wherein the supply pump is a reversible fixed-displacement pump.

4. The module according to claim 1, wherein the electric machine is an electric motor.

5. The module according to claim 1, wherein the module comprises a drive shaft configured to drive the hub in rotation and a mechanical speed reducer configured to connect the drive shaft to a low-pressure shaft of the turbine engine, the speed reducer being arranged downstream of the electric machine along the longitudinal axis (X) and comprising a first element intended to cooperate with the low-pressure shaft, a second element secured in rotation to the drive shaft and a third element fixed in rotation and connected to the stationary member of the electric machine.

6. The module according to claim 5, wherein the first element is a sun gear, the second element is a ring gear and the third element is a planet carrier.

7. The module according to claim 1, wherein the device comprises a hydraulic accumulator fixed in rotation relative to the longitudinal axis (X) and in fluid communication with the supply pump, the hydraulic accumulator being arranged downstream of the hydraulic actuator along the longitudinal axis (X).

8. The module according to 1, characterised in that the device comprises a hydraulic accumulator arranged upstream of the hydraulic actuator along the longitudinal axis (X) and secured to the hydraulic actuator, the hydraulic accumulator being in fluid communication with the supply pump.

9. The module according to claim 1, wherein the pump has an operating regime which is a function of a power of the electric machine, the module further comprising an electronic control circuit connected to the electric machine configured to modulate the power of the electric machine.

10. The module according to claim 9, wherein the electronic control circuit is configured to receive an order (O1) transmitted by a control unit, the order (O1) being a function of an information (I1, I2) relating to an aircraft and/or to the turbine engine and/or to the position of the vanes relative to their pitch axes (C) and received by the control unit.

11. The module according to claim 1, wherein the module comprises an internal space in which the device is arranged.

* * * * *